United States Patent
Desboilles et al.

(10) Patent No.: US 6,405,605 B1
(45) Date of Patent: Jun. 18, 2002

(54) HALL STRIP TORQUE SENSOR

(75) Inventors: Pascal Desboilles, Glieies; Christophe Nicot, Annecy; Fernand Peilloud, Alby, all of (FR)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/599,123

(22) Filed: Jun. 22, 2000

(30) Foreign Application Priority Data

Jun. 24, 1999 (FR) .............................. 99 08085

(51) Int. Cl.[7] ................................. G01L 3/02
(52) U.S. Cl. ................................. 73/862.335
(58) Field of Search ............ 73/862.331, 862.332, 73/862.333, 862.334, 862.335, 862.193

(56) References Cited

U.S. PATENT DOCUMENTS

| | | | | |
|---|---|---|---|---|
| 4,429,276 A | * | 1/1984 | Narimatsu et al. | 324/207.21 |
| 4,590,806 A | * | 5/1986 | Lutton et al. | 73/862.327 |
| 4,874,053 A | * | 10/1989 | Kimura et al. | 189/79.1 |
| 5,265,480 A | * | 11/1993 | Tsuji et al. | 73/862.325 |
| 5,501,110 A | | 3/1996 | Peilloud et al. | |
| 5,589,769 A | | 12/1996 | Krahn | |

FOREIGN PATENT DOCUMENTS

EP 0 427 882 A1 11/1989

* cited by examiner

*Primary Examiner*—Max Noori
(74) *Attorney, Agent, or Firm*—John C. Bigler

(57) ABSTRACT

A torque sensor to determine the torque exerted on an assembly comprising a component generating magnetic impulses, with this sensor comprising a number of aligned sensor components divided into two subassemblies, the signals emitted by such subassemblies being processed by an electronic circuit capable of delivering an analog signal as a function of the torque exerted. The invention also proposes a process for processing the signals emitted by such a sensor.

11 Claims, 2 Drawing Sheets

Figure 1:
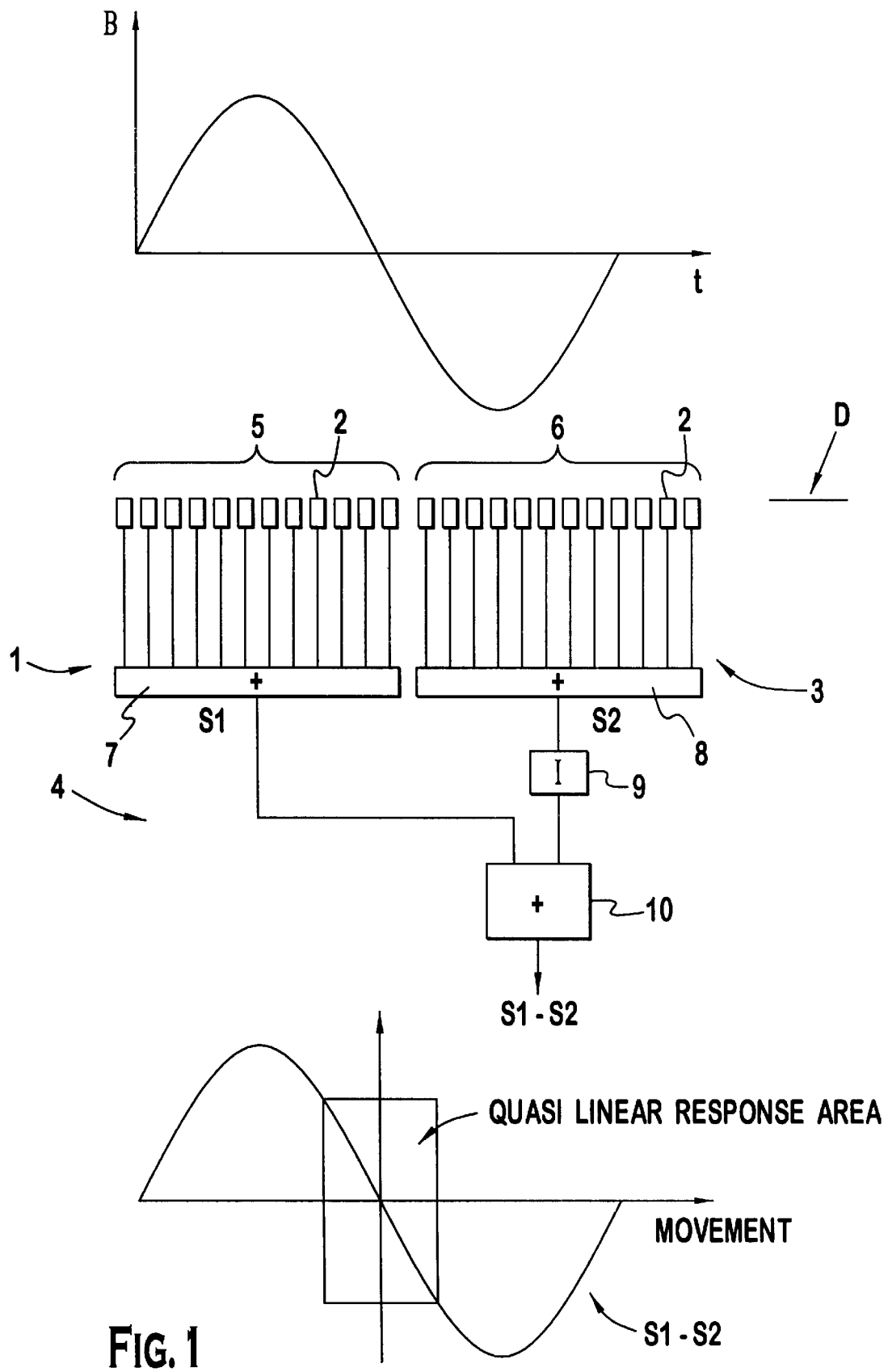

$SIN = (S1 - S2) - (S1' - S2')$
$COS = (S1 + S2) - (S1' + S2')$

HALL STRIP TORQUE SENSOR

BACKGROUND OF THE INVENTION

This invention relates generally to magnetic sensors and, more particularly, but not exclusively, to magnetic torque sensors employed in power steering systems in vehicles.

Such systems traditionally include a torque sensor mounted in relation to the vehicle's steering device. Already known in the prior art are torque sensors that use the Hall-effect, for example, as described in document FR-A-2 689 633. There are also known torque sensors that detect the relative movement between, on the one hand, a magnetic design associated with a part that deforms under the effect of the exerted torque and, on the other, a Hall-effect sensor associated with a generally unconstrained part. Such devices are based on the use of a magnetic design that represents a quick transition opposite which is positioned the analog-output Hall-effect sensor.

Such devices have the following disadvantages: The sensitivity of the sensor may vary as a function of temperature. In fact, the latter takes into account the drift of the sensor and the magnets. Some correction principles consist of using a Hall-effect sensor that partially compensates for the drift in temperature of the magnets or appropriate electronic processing. This principle results in limited performance, once random drifts and sensor offsets are taken into account. Also, a magnetic shielding device must be used in order to overcome any outside magnetic disturbances. And, the sensor components must be positioned accurately, opposite the magnetic transition, in order to minimize magnetic offset, and the zero temperature drift that results from it.

There also are known devices capable of detecting the relative movement of a source of a magnetic field and comprising several Hall probes combined together in a subassembly and placed in a predetermined layout and possibly in a straight line.

Documents WO A 94 05 974 and WO A 94 05 975 describe devices comprising Hall-effect components positioned at a predetermined distance from one another in a predetermined layout. Document EP A 590 222 describes a magnetic position sensor capable of detecting the positions of a magnetic component having a field component that is canceled out in at least one point in space, the sensor including a network of Hall-effect probes aligned in a direction perpendicular to this field component and to the current circulating through the probes. We also refer you to document EP A 591 113. Document WO A 93 22 623 describes a device that generates a cumulative signal representing the position of a magnet in relation to a linear series of Halle-effect switches.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is provided by a torque sensor to determine the torque exerted on an assembly comprising a component generating magnetic impulses. The sensor comprises a plurality of aligned sensor components that are divided into at least two subassemblies, the signals emitted by the subassemblies being processed by an electronic circuit capable of delivering an analog signal as a function of the torque exerted. The sensor components, even in number for example, are chosen from among the groups including Hall-effect probes, magnetic resistances, and giant magnetic resistances, and they are positioned equidistant from one another.

In another aspect of the invention, this is provided by a process for processing a signal emitted by a torque sensor having a plurality of aligned sensor components, the process comprising the following steps: creation of at least two subassemblies of N sensor components; adding signals emitted by each sensor component of the first subassembly to form first sum $S_1$; adding signals emitted by each sensor component of the second subassembly to form second sum $S_2$; and adding signals $S_1$ and $-S_2$ to obtain a signal as a function of torque exerted. The choice of the number of sensor components chosen to create the subassemblies of sensor components may be made using programs of EEPROM, ZENER ZAPPING type, or the like.

In a variant of the invention, a multiple of four sensor components is used to form four subassemblies for signal process too obtain a signal as a function of the torque exerted. In a subvariant, a programmable gain G is applied to signal COS and/or to signal SIN in order to obtain signal SIN+G.COS or G.SIN+COS as a function of the torque exerted which intensity is null when the exerted torque is null. The process may include the following steps: detecting a maximum signal emitted by each sensor component; and regulating the sensitivity of the sensor as a function of the maximum signal detected.

According to a third aspect, a device is proposed for implementing a process described above, including a customized ASIC type of integrated circuit. According to a fourth aspect, a torque sensor assembly as described above is combined with such a device, wherein the sensor components of the sensor are included in the customized ASIC integrated circuit. According to a fifth aspect, the above-described assembly is applied to determine torque by detecting relative movement of the sensor components with respect to at least two pairs of magnetic poles with inverted magnetic direction of a given pole in relation to those that are contiguous to it so as to reduce edge effects and to obtain a sinusoidal magnetic field over the entire measurement area.

The foregoing and other aspects will become apparent from the following detailed description of the invention when considered in conjunction with the accompanying drawing figures.

BRIEF DESCRIPTION OF THE DRAWING FIGS.

Figure 2:
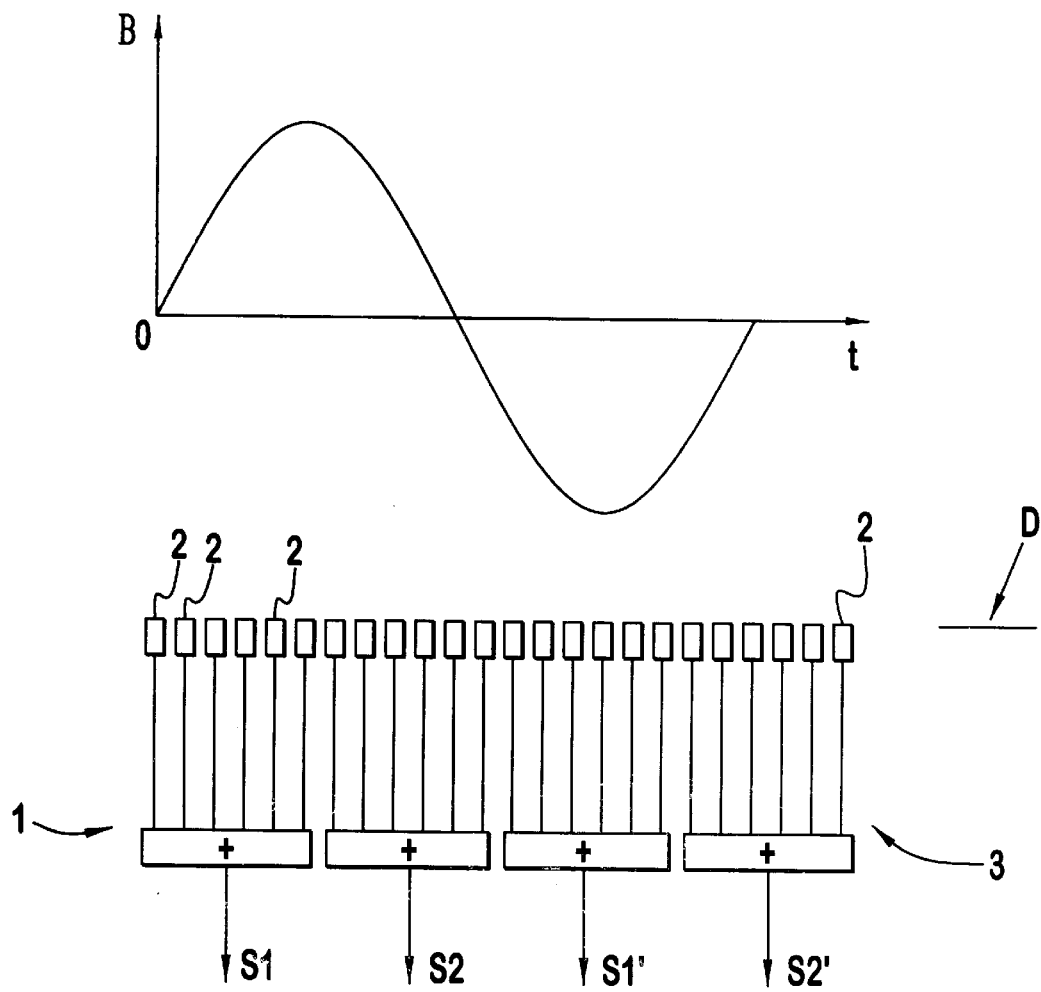
Figure 2:
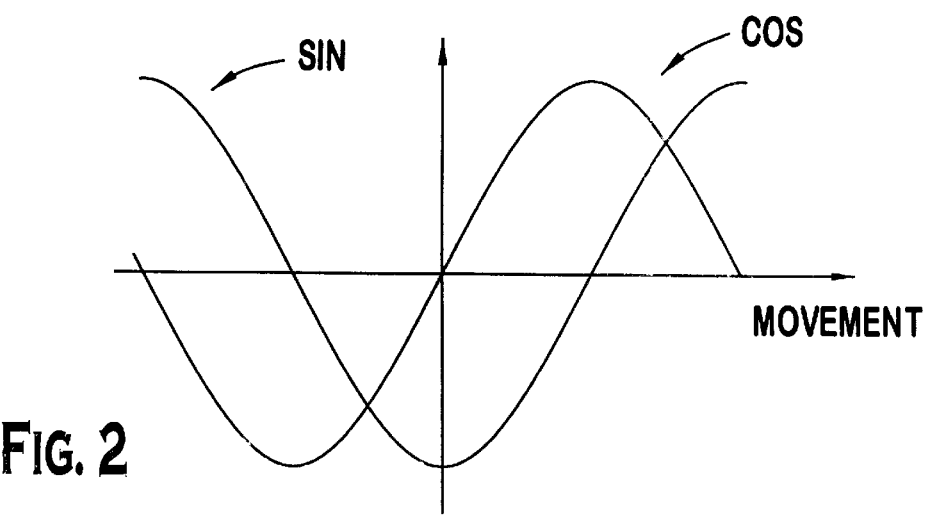

FIG. 1 represents a mode of embodiment of the detection device according to the invention; and FIG. 2 represents a second mode of embodiment of the detection device according to the invention.

DETAILED DESCRIPTION

Referring now to the drawings, detection device 1 includes an even number 2N of sensor components 2 of the magnetic-resistance or Hall-effect probe type, placed at an equal distance d from one another, the components 2 being placed roughly along straight line D. For example, sensor components 2 may be placed in an arc of a circle that may approximate a straight line. In the modes of embodiment represented, twenty-four sensor components 2 are provided.

This arrangement defines strip 3 of sensor components 2 with a length (2N−1) d.

The detection device also includes electronic circuit 4 making it possible to process the analog signals emitted by the various sensor components 2 in order to obtain such information as, for example, the angular position of a multipolar magnetic component placed opposite strip 3. The detection device may also be composed of a substrate of silicon or its equivalent, such as AsGa, so as to form an integrated circuit that is customized for the specific application, this circuit possibly being designed according to the term ASIC to refer to the integrated circuit designed partly or entirely as a function of need.

When the multipolar magnetic component comprises two pairs of magnetic poles with inverted magnetic direction of a given pole in relation to those contiguous to it, the magnetic induction of the gap in question may be similar to a sinusoidal shape over the entire measurement area and will therefore not experience any deformations caused by edge effects. In fact, the presence of two supplementary poles permits such edge effects to be pushed outside the measurement area. The magnetic period of the field is therefore defined as the period of the sinusoidal wave delivered to the gap.

In the represented modes of embodiment, strip 3 of sensor components 2 covers a full magnetic period. In a variant, when strip 3 of sensor components 2 detects more than one magnetic period, the length of strip 3 of sensor components 2 may be reduced to 2M components used of the 2N (M being less than N), by using programs of the EEPROM or ZENER ZAPPING type, for example.

In the mode of embodiment in FIG. 1, the assembly of sensor components 2 is divided into two subassemblies 5, 6 of N components. Each sensor component 2 of first subassembly 5 is connected to first adder 7 such as an amplifier capable of adding the signals emitted by the N first sensor components 2. Likewise, each sensor component 2 of second subassembly 6 is connected to second adder 8 capable of adding the signals emitted by the N other sensor components. Output $S_1$ of first adding means 7 and, via inverter 9, output $S_2$ of second adding means 8 are connected to the input of third adding means 10. Thus, appearing at the output of third adding means 10 is signal $S_1-S_2$ which is a function of the torque exerted (i.e. of the relative movement of strip 3 opposite the magnetic component).

In this first mode of embodiment, strip 3 of sensor components 2 is positioned at null torque opposite the magnetic component. The variation of signal $S_1-S_2$ delivered as a function of the movement of the magnetic component opposite strip 3 of sensor components 2 is then sinusoidal centered on zero (see FIG. 1). By choosing the appropriate rigidity for the torque measurement range, the result is a quasi linear output as a function of torque. The magnetic offset corresponds to a continuous component that is added to detected signals $S_1$ and $S_2$. However, since the magnetic offset or the outside magnetic disturbances are assumed to be uniform throughout the assembly of sensor components, the subtraction $S_1-S_2$ does not include any continuous component linked to magnetic offset.

In a variant (not shown) of this mode of embodiment, output $S_1$ from first adding means 7 and output $S_2$ from second adding means 8 are connected to a supplementary adding means so as to form the signal $S_1+S_2$.

One means to achieve the precise positioning of strip 3 of sensor components 2 opposite the magnetic component is therefore to form a linear combination of signals $S_1+S_2$ and $S_1-S_2$ by amplifying one of these two signals using programmable gain G. This approach is described below in relation to the second mode of embodiment. However, the signal so obtained as a function of exerted torque is not exempt from the magnetic offset of the coder nor from outside disturbances since the signal $S_1+S_2$ is obtained by adding $S_1$ and $S_2$.

The second mode of embodiment represented in FIG. 2 makes it possible to achieve the precise positioning of strip 3 of sensor components 2 opposite the magnetic component while using a signal as a function of the exerted torque that is free of magnetic offset. Strip 3 of sensor components 2 is broken down into four quadrants of P sensor components, and an electronic circuit based on an adding amplifier and inverter that makes it possible to obtain signals $S_1$, $S_2$, $S'_1$, and $S'_2$ emitted respectively by the first, second, third, and fourth subassemblies of P sensor components of a strip with 4P sensor components. The analog signals so formed are, therefore, the following:

$$SIN=(S_1-S_2)-(S'_1-S'_2),$$

and $$COS=(S_1+S_2)-(S'_1+S'_2).$$

The described detection device delivers two signals SIN and COS in perfect quadrature that are also exempt from magnetic offset since they are obtained by subtraction of quadrants. These two signals or their sum are a function of the exerted torque (i.e., of the relative movement of strip 3 opposite the magnetic component). A shift in the positioning of strip 3 of sensor components 2 opposite the magnetic component causes the output signals to drift from zero (i.e., the signal is not null when torque is null in the event of incorrect centering).

One means of overcoming this problem is to amplify the signal SIN and/or the signal COS using programmable gain G, then to obtain, using an adding means, the sum of the amplified signals. For example, in the case where only the COS signal is amplified, the signal used to measure the exerted torque is therefore SIN+G.COS. One example of achieving zero adjustment may therefore consist of positioning strip 3 of sensor components 2 roughly opposite the magnetic component and then adjusting gain G by programming so that the signal SIN+G.COS is null when torque is null.

In a variant of the two modes of embodiment described above, the torque sensor supplies an analog signal independent of the temperature. To that end, the signals emitted by each sensor component 2 are connected to a detection means that permits selection of the maximum signals. As a function of the latter, and via a current regulator inserted in sensor components 2, the sensitivity of sensor components 2 may be adjusted so as to obtain a signal at the sensor output which amplitude is constant and independent of the temperature. Similarly, it appears that such a device makes it possible to obtain a signal at the torque sensor output that is independent of gap variations.

Having described the invention, what is claimed is:

1. A torque detection device comprising:
 a magnetic component comprising multiple magnetic poles providing a variable magnetic induction along a line;
 a plurality of sensor components that are aligned with and positioned opposite the magnetic component, the sensor components being divided into at least two subassemblies such that signals emitted by the subassemblies and processed by an electronic circuit are capable of delivering an analog signal as a function of the torque exerted, wherein the sensor components are included in a customized HSIC type of integrated circuit.

2. A detection device according to claim 1, wherein the sensor components are chosen from among the groups including Hall-effect probes, magnetic resistances, and giant magnetic resistances.

3. A detection device according to claim 1, wherein sensor components are positioned equidistant from one another.

4. A detection device according to claim 1, wherein the number of sensor components is even.

5. A process for processing a signal emitted by a torque detection device comprising a magnetic component comprising multiple magnetic poles providing a variable magnetic induction along a line and a plurality of aligned sensor components that are aligned with and positioned opposite the magnetic component, the process comprising the follow steps:

creation of at least two subassemblies of N sensor components;

adding signals emitted by each sensor component of the first subassembly to form first sum $S_1$;

adding signals emitted by each sensor component of the second subassembly to form second sum $S_2$; and adding signals $S_1$ and $-S_2$ to obtain a signal as a function of the torque exerted;

wherein at least a portion of the process is effected by a customized A SIC type of integrated circuit.

6. A process for processing a signal emitted by a torque detection device comprising a magnetic component comprising multiple magnetic poles providing a variable magnetic induction along a line and a plurality of aligned sensor components that are aligned with and positioned opposite the magnetic component, the process comprising the follow steps:

creation of at least two subassemblies of N sensor components;

adding signals emitted by each sensor component of the first subassembly to form first sum $S_1$;

adding signals emitted by each sensor component of the second subassembly to form second sum $S_2$; and adding signals $S_1$ and $-S_2$ to obtain a signal as a function of the torque exerted;

wherein the choice of the number of sensor components chosen to create the subassemblies of sensor components is made using programs of EEPROM or ZENER ZAPPING type.

7. A process for processing a signal emitted by a torque sensor having a plurality of aligned sensor components, wherein the number of sensor components is a multiple of four and the sensor components are used to form four subassemblies of P sensor components, the process further comprising the following steps:

adding the signals emitted by each sensor component of the first subassembly to form signal $S_1$;

adding the signals emitted by each sensor component of the second subassembly to form signal $S_2$;

adding the signals emitted by each sensor component of the third subassembly to form signal $S'_1$;

adding the signals emitted by each sensor component of the fourth subassembly to form signal $S'_2$;

forming at least one signal selected from the group of signals $SIN=S_1-S_2-(S'_1-S'_2)$, $COS=S_1+S_2-(S'_1+S'_2)$, and $SIN+COS$ to obtain a signal as a function of the torque exerted.

8. A process according to claim 7, wherein a programmable gain G is applied to signal COS in order to obtain a signal $SIN+G.COS$ as a function of the torque exerted whose intensity is null when the exerted torque is null.

9. A process for processing a signal emitted by a torque detection device comprising a magnetic component comprising multiple magnetic poles providing a variable magnetic induction along a line and a plurality of aligned sensor components that are aligned with and positioned opposite the magnetic component, the process comprising the follow steps:

creation of at least two subassemblies of N sensor components;

adding signals emitted by each sensor component of the first subassembly to form first sum $S_1$;

adding signals emitted by each sensor component of the second subassembly to form second sum $S_2$; and adding signals $S_1$ and $-S_2$ to obtain a signal as a function of the torque exerted;

further comprising the steps of detecting a maximum signal emitted by each sensor component and regulating the sensitivity of the sensor as a function of the maximum signal detected.

10. A torque sensor according to claim 1 wherein the component generating magnetic impulses includes at least two pairs of magnetic poles with inverted magnetic direction of a given pole in relation to those that are contiguous to it in order to reduce edge effects and to obtain a sinusoidal magnetic field over the entire measurement area.

11. A process according to claim 7, wherein a programmable gain G is applied to signal SIN in order to obtain a $G.SIN+COS$ as a function of the torque exerted whose intensity is null when the exerted torque is null.

* * * * *

UNITED STATES PATENT AND TRADEMARK OFFICE
CERTIFICATE OF CORRECTION

PATENT NO. : 6,405,605 B1
DATED : June 18, 2002
INVENTOR(S) : Pascal Desbiolles, Christophe Nicot and Fernand Peilloud It is certified that error appears in the above-identified patent and that said Letters Patent is hereby corrected as shown below:

Column 1,
Line 52, delete "Halle-effect" and insert -- Hall-effect --.

Column 5,
Line 4, delete "HSIC" and insert -- ASIC --.
Line 30, delete "A SIC" and insert -- ASIC --.

Signed and Sealed this

Twentieth Day of August, 2002

Attest:

Attesting Officer

JAMES E. ROGAN
Director of the United States Patent and Trademark Office